United States Patent [19]

Takase et al.

[11] Patent Number: 5,042,027

[45] Date of Patent: Aug. 20, 1991

[54] COMMUNICATION NETWORK SYSTEM AND METHOD OF CONTROLLING A COMMUNICATION NETWORK

[75] Inventors: Akihiko Takase, Tokyo; Masahiro Takatori, Kokubunji; Yoshiaki Takemura, Sagamihara; Naoya Kobayashi, Mitaka; Yasushi Sawada, Koganei; Yukio Nakano; Yasushi Takahashi, both of Hachioji; Masahiro Koya, Kodaira; Yoshitaka Takasaki, Tokorozawa, all of Japan

[73] Assignee: Hitachi, Ltd., Tokyo, Japan

[21] Appl. No.: 404,535

[22] Filed: Sep. 8, 1989

[30] Foreign Application Priority Data

Sep. 12, 1988 [JP] Japan ................................ 63-226612

[51] Int. Cl.$^5$ ..................... H04Q 11/00; H04M 15/00
[52] U.S. Cl. ......................................... 370/54; 370/60; 340/827; 379/133; 379/136; 379/221
[58] Field of Search ..................... 370/16, 54, 13, 17, 370/60, 94.1; 340/825.03, 826, 827, 825.06, 825.15; 379/219, 220, 221, 271, 272, 273, 133, 134, 136

[56] References Cited

U.S. PATENT DOCUMENTS

| | | | |
|---|---|---|---|
| 4,561,090 | 12/1985 | Turner | 370/13 |
| 4,656,658 | 4/1987 | King | 379/221 |
| 4,669,113 | 5/1987 | Ash et al. | 379/221 |
| 4,736,363 | 4/1988 | Aubin et al. | 370/94.1 |
| 4,737,983 | 4/1988 | Frauenthal et al. | 379/221 |
| 4,748,658 | 5/1988 | Gopal et al. | 379/229 |
| 4,866,763 | 9/1989 | Cooper et al. | 379/221 |
| 4,873,517 | 10/1989 | Baratz et al. | 370/54 |
| 4,939,726 | 7/1990 | Flammer et al. | 370/94.1 |

Primary Examiner—Douglas W. Olms
Assistant Examiner—Alpus H. Hsu
Attorney, Agent, or Firm—Pennie & Edmonds

[57] ABSTRACT

A communication network system includes a communication line, a plurality of communication stations each having a node coupled to the communication line and a network controller coupled to the stations for controlling routing for communication messages between nodes. In one embodiment, the messages are sent from plural terminals connected with each node along with communication performance prerequisites. The communication performance prerequisites for a communication message are discriminated in the node which receives the message. Traffic in various routes between the nodes is continually measured in the communication stations and the measuring results are stored in a database storage unit. Future traffic in the various routes is predicted on the basis of the information on the continually measured traffic by the use of a predetermined algorithm and stored in the storage unit for use in determination of routes for communication messages on the basis of the result of the communication performance prerequisites discrimination and predetermined criteria with respect to the updated information on the predicted traffic in the storage unit.

21 Claims, 16 Drawing Sheets

FIG.3A

TRAFFIC HISTORY TABLE

| ORIGINATION NODE | ROUTE | DESTINATION NODE | DATE AND TIME | TRAFFIC |
|---|---|---|---|---|
| | | | | |

FIG.3B

ROUTING TABLE

| ORIGINATION NODE | ROUTE | DESTINATION NODE | ALLOWABLE TRAFFIC | CURRENT TRAFFIC | PREDICTED TRFAFFIC |
|---|---|---|---|---|---|
| | | | | | |

FIG.3C

SIGNIFICANT CALL TABLE

| SIGNIFICANT CALL ID NUMBER | ORIGINATION NODE | ROUTE | DESTINATION NODE | CURRENT LINK PERFORMANCE | PREDICTED LINK PERFORMANCE |
|---|---|---|---|---|---|
| | | | | | |

FIG.5
ROUTE ESTABLISHMENT

5-1
TERMINAL 13 INFORMS NODE 11, IN ADVANCE OF COMMUNICATION, OF CALLED SUBSCRIBER NUMBER, COMMUNICATION PERFORMANCE PREREQUISITES THROUGH D-CHANNEL SUBSCRIBER LINE SIGNALLING

↓

5-2
NODE 11 SEPARATES SUBSCRIBER'S LINE SIGNALLING AT SUBSCRIBER MODULE 1110 AND TRANSFERS IT TO CALL CONTROLLER 16

↓

5-3
SUBSCRIBER'S LINE SIGNALLING PROCESSING UNIT 1611 DECODES SUBSCRIBER'S LINE SIGNALLING AND TRANSFERS IT TO CALL CONTROL PROCESSING UNIT 1612

↓

5-4
CALL CONTROL PROCESSING UNIT 1612 TRANSLATES CALLED SUBSCRIBER NUMBER TO NODE NAME

↓

5-5
CALL CONTROL PROCESSING UNIT 1612 INFORMS NETWORK CONTROLLER 14 OF ORIGINATION NODE, DESTINATION NODE, COMMUNICATION PERFORMANCE PREREQUISITES VIA COMMON CHANNEL SIGNALLING PROCESSING UNIT 1614 AND COMMON CHANNEL SIGNALLING NETWORK 121

↓

5-6
NETWORK CONTROLLER 14 FINDS CANDIDATES FOR ROUTES SATISFYING CONDITIONS FOR ORIGINATION NODE, DESTINATION NODE, COMMUNICATION PERFORMANCE PREREQUISITES BY RETRIEVAL IN ROUTING TABLE (FIG. 3C)

↓

5-7
NETWORK CONTROLLER 14 SELECTS ONE ROUTE AMONG ROUTE CANDIDATES SATISFYING PREDICTED TRAFFIC < ALLOWABLE TRAFFIC AND INFORMS ORIGINATION NODE AND CALL CONTROLLER (S) 14 ON SELECTED ROUTE OF SUCH ROUTING VIA COMMON CHANNEL SIGNALLING NETWORK

↓

5-8
CALL CONTROLLER 16 CONTROLS SWITCH 1111 IN NODE 11 FOR ROUTING OF CALL DESIGNATED BY NETWORK CONTROLLER 14

FIG.7

7-1) ROUTING FOR SIGNIFICANT CALL

NETWORK CONTROLLER 14
(a) DETERMINES ROUTE FOR SIGNIFICANT CALL
(b) ATTACH UNCOMMON CALL ID NUMBER
(c) REGISTER IN SIGNIFICANT CALL TABLE ID NUMBER, ORIGINATION NODE, DETERMINED ROUTE, DESTINATION NODE FOR SIGNIFICANT CALL

7-2)

NETWORK CONTROLLER 14
(a) APPLIES LINK PERFORMANCE DATA, SEQUENTIALLY DELIVERED VIA COMMON CHANNEL SIGNALLING NETWORK 121, TO DATA ANALYZER 19
(b) UPDATES "PREDICTED LINK PERFORMANCE" IN SIGNIFICANT CALL TABLE (FIG. 3B)

7-3)

NETWORK CONTROLLER 14 ISSUES, WHEN PREDICTED LINK PERFORMANCE IS DECREASED TO LESS THAN ALLOWABLE LINK PERFORANCE, COMMAND TO SWITCH ROUTE TO MULTIPLEXER CONTROLLING UNIT 1615 IN ASSOCIATED CALL CONTROLLER 16 VIA COMMON CHANNEL SIGNALLING NETWORK 121

7-4)

NETWORK CONTROLLER 14 UPDATES "ROUTE" IN UNCOMMON CALL TABLE (FIG. 3B)

7-5)

MULTIPLEXER CONTROLLING UNIT 1615 IN CALL CONTROLLER 16 CONTROLS MULTIPLEXER 1112 IN NODE 11 VIA NODE INTERFACE 1610

FIG. 10A

CALLED SUBSCRIBER'S NUMBER ESTABLISHMENT HISTORY TABLE

| CALLED SUBSCRIBER'S NUMBER | NUMBER OF TIMES OF CALL ESTABLISHMENT |
|---|---|
| | |

FIG. 10B

ESTABLISHMENT HISTORY TABLE FOR CALL FORWARDING ADDRESS FOR TEMPORARY ABSENCE

| NUMBER FOR CALL FORWARDING ADDRESS FOR TEMPORARY ABSENCE | NUMBER OF TIMES OF CALL ESTABLISHMENT |
|---|---|
| | |

FIG. 10C

PROTOCOL ESTABLISHMENT HISTORY TABLE

| PROTOCOL ESTABLISHMENT | | | | NUMBER OF TIMES OF ESTABLISHMENT |
|---|---|---|---|---|
| INFORMATION BIT NUMBER | PARITY | KANJI (CHINESE CHARACTER) CODE | ---- | |
| | | | | |

COMMUNICATION NETWORK SYSTEM AND METHOD OF CONTROLLING A COMMUNICATION NETWORK

BACKGROUND OF THE INVENTION

This invention related to communicatation network systems and control of communication networks, and particularly to a communication network system using database information.

In designing a communication network having a great number of nodes and links connecting these nodes, effective use is normally made of network resources by allowing a certain extent of blocking communication messages. In order to minimize the blocking in the network using an arbitrary amount of resource, it is necessary to examine the construction of the network and the effective algorithm for the routing.

The design of the network construction or routing has been made on the basis of the traffic demand prediction at the time of constructing the communication equipment.

Recently, however, the traffic of communication messages in the communication network mainly for data other than POTS (Plane Ordinary Telephone Service) has been rapidly increased in the communication network with the development of the information-oriented society. Therefore, it becomes now more difficult than before to predict the traffic demand in the communication network. Particularly in the network such as the private communication network, in which the traffic is greatly dependent on the change of business due to the social conditions and business fluctuations, it is further difficult to design the communication network.

The technique called the dynamic routing has recently been used under this background. In this technique, the traffic in the communication network having three or more communication nodes is always measured and used to dynamically control the theoretical communication network construction to match the traffic at that time. An application of this technique is disclosed in JP-A-61-251261 (laid open on Nov. 8, 1986 and corresponding to U.S. Ser. No. 727,880 filed in the United States on Apr. 26, 1985).

According to this example, the communication traffic is measured every five seconds, and the amount of communication data is also measured every five minutes. Then, the fluctuations of the traffic are estimated from the measured values, and the network construction is dynamically changed by the most suitable routing on the basis of the comparison with the long-term prediction of demand. In other words, to theoretically increase the capacity of the link in which the traffic has the trend to increase contrary to the estimate, the by-paths to other communication nodes are dynamically established. This dynamical routing technique intends to minimize the blocking in the communication network by balancing the loads to the communication nodes and links.

The communication nodes in this communication network are assumed as the circuit switching type nodes. On the contrary, the communication nodes called the ATM (Asynchronous Transfer Mode) type nodes have recently been discussed. In this mode, the real time information such as voice or moving image are exchanged as communication messages by the same method as the packet exchange. In the ATM type communication node, it is also possible to minimize the blocking by the same dynamic routing based on the estimation of traffic as in the above-mentioned conventional example.

In the ATM type communication, however, the communication performance is affected by the traffic because it uses the packet switching type switching technique. In other words, the information passing through the communication node having large traffic are delayed much and, when the traffic fluctuation is large, the delay time is greatly fluctuated.

Since the above-mentioned conventional example intends to minimize the blocking by the use of the technique for balancing the loads to the communication nodes on the basis of the traffic measurement, it does not make any control of the communication performance other than the blocking in the ATM type communication node.

Moreover, in the prior art including the above-mentioned conventional example, the network control is mainly on the basis of the traffic measurement, and does not consider the performance of communication links between the communication nodes. As a result, the effect of deteriorated performance of communication links on the communication performance cannot be avoided except that the defective line is replaced by a spare line upon line failure.

SUMMARY OF THE INVENTION

The communication messages (containing communication information such as voice, data or the like) transmitted and received between terminals (nodes) in the communication network have communication performance prerequisites for the transmission delay time, variation range of transmission delay time, packet loss rate, transmission error rate and so on. Therefore, it is important for the communication network to assure the communication performance such as the transmission delay time and so on in addition to the suppression of the blocking.

Accordingly, it is an object of this invention to provide a communication network system capable of assuring the communication performance which meets the communication performance prerequisites of the communication messages, thereby enabling the messages between the terminals to be satisfactorily transmitted and received.

It is another object of this invention to provide a method of controlling the communication network to make satisfactory transmission and reception between the terminals with the communication performance being assuredly made to meet the communication performance prerequisites of the communication messages.

According to one aspect of this invention, there is provided a communication network system comprising a communication line, a plurality of communication stations having nodes coupled to the communication line, and control means coupled to the communication stations for controlling the routing for communication messages between the nodes. The messages may be transmitted together with communication performance prerequisites from a plurality of terminals connected to the nodes, or communication performance prerequisites may be sent in advance of messages from terminals to nodes. In other cases, messages may be transmitted on the public lines or via the leased lines which have higher priority than the public lines. This can be regarded as a kind of the communication performance prerequisites.

The communication performance prerequisites of the messages are discriminated at the nodes where the messages are received. The traffic in the different routes between the nodes is continually or intermittently measured at the communication stations, and the measured results are stored in a database storage unit. The further traffic in different routes is predicted by use of a predetermined algorithm on the basis of the measured traffic stored in the storage unit. The routing for the communication messages is determined on the basis of the result of the discrimination of the communication performance prerequisites and the predetermined criteria on the predicted future traffic updated and stored in the strage unit.

Thus, when one terminal calls toward an ATM type communication node, a necessary communication performance (communication performance prerequisites) may be communicated to the communication node. Then, the routing is made to assure the communication performance prerequisites on the basis of the current measured traffic which the communication node has measured and the future traffic information which a network controller has predicted.

According to another aspect of this invention, not only traffic but also link performance is monitored and the future link performance information predicted from the monitoring and the future traffic information are reflected in the routing.

In the ATM type communication network including ATM type communication nodes, there are mixed real-time communication messages absolutely requiring the assurance of communication performance such as delay time, and non-real-time communication messages such as communication data. These messages can be considered to be distributed uniformly from a statistical point of view, and all the calls do not always require real-time communication. By making use of this statistical fact, it is possible to assure a predetermined communication performance even when the traffic is increased.

Therefore, not only is the blocking minimized, but the routing is made to assure necessary communication performance on the basis of the communication performance prerequisites of the messages. That is, the traffic is not balanced in any case as in the conventional example, but may be unbalanced to some extent in accordance with the communication performance prerequisites of the messages. For example, the messages for which real-time property is not required are routed to high-traffic nodes and links, while the messages for which real-time property is required are routed to low-traffic nodes and links. Thus, a predetermined communication performance can be assured in accordance with the communication performance prerequisites of the messages.

Moreover, the communication performance is affected not only by the traffic but also by the performance of communication links. Thus, the communication performance of links is predicted from the information such as the transmission error rate which is monitored, and used for the routing to assure a predetermined communication performance, thereby ensuring the communication performance for the network.

BRIEF DESCRIPTION OF THE DRAWINGS

FIGS. 3A, 3B and 3C show examples of formats of tables stored in the database storage unit in the embodiments shown in FIG. 1 and/or FIG. 2.

FIG. 5 is a flow chart showing the processes for routing in the embodiment of FIG. 1.

FIG. 7 is a flow chart showing the processes for routing in the embodiments of FIGS. 1 and 2.

FIGS. 10A, 10B and 10C show examples of formats of tables stored in the database storage unit in the embodiment of FIGS. 8A, 8B and 8C.

DESCRIPTION OF THE PREFERRED EMBODIMENTS

Figure 1:
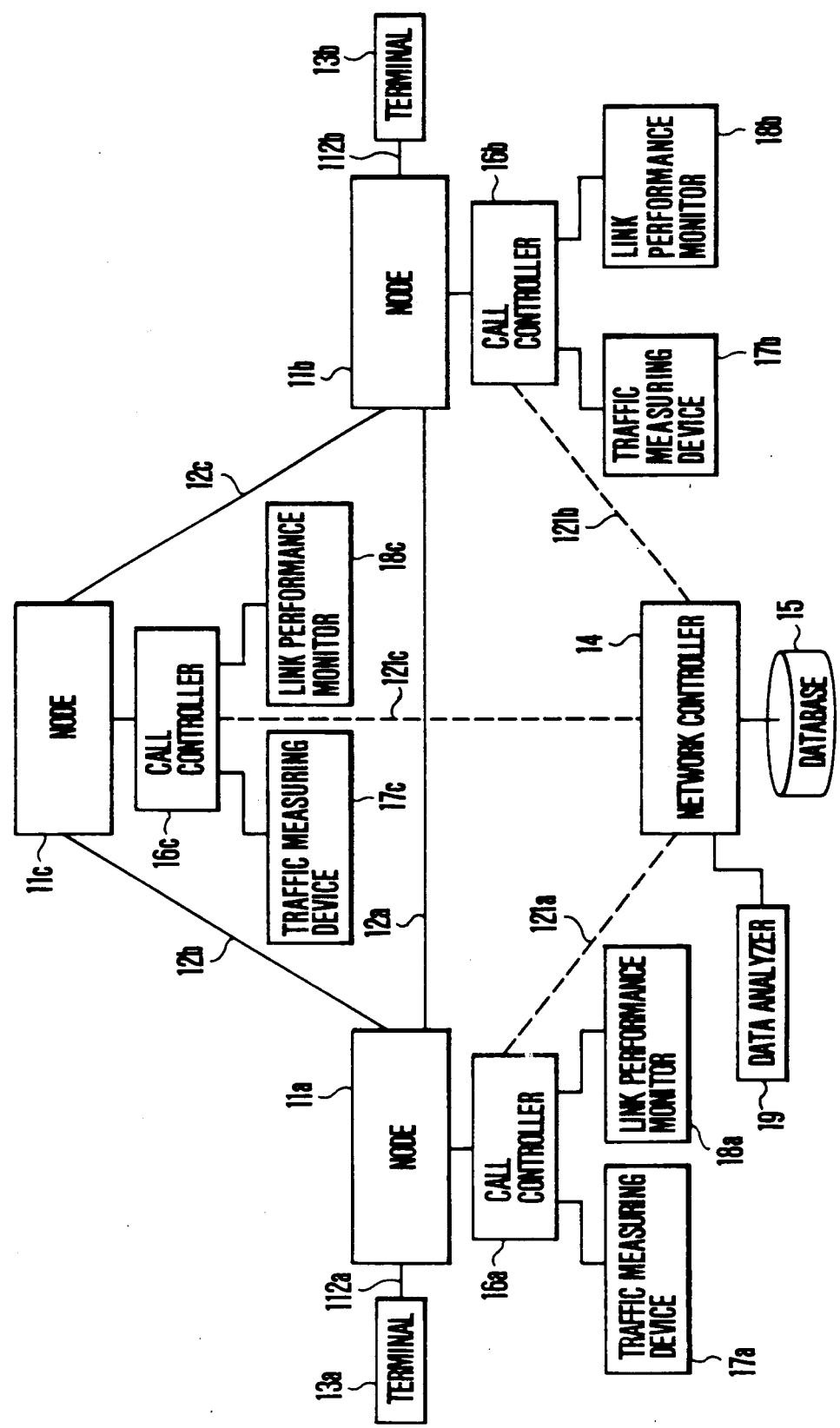
FIG. 1 is a block diagram of one embodiment of a communication network system of this invention.

FIG. 1 shows one embodiment of a communication network system of this invention. There are shown communication nodes 11a, 11b and 11c, communication links 12a, 12b and 12c constituting a communication line, a calling terminal 13a, a called terminal 13b, call controllers 16a, 16b and 16c, traffic measuring devices 17a, 17b and 17c, link performance quality monitors 18a, 18b and 18c, common channel signalling network 121a, 121b and 121c, subscriber's links 112a and 112b, a network controller 14, a database storage unit 15, and a data analyzer 19. Although the node 11c is not provided with a terminal so that it serves as a repeating node, a terminal may be connected with the node as the case demands.

Although one terminal is shown at each node, a plurality of terminals may be respectively connected to one node physically or logically. The node 11a, 11b or 11c, the call controller 16a, 16b or 16c, the traffic measuring device 17a, 17b or 17c and the link performance quality monitor 18a, 18b or 18c constitute a communication station.

Figure 1A:
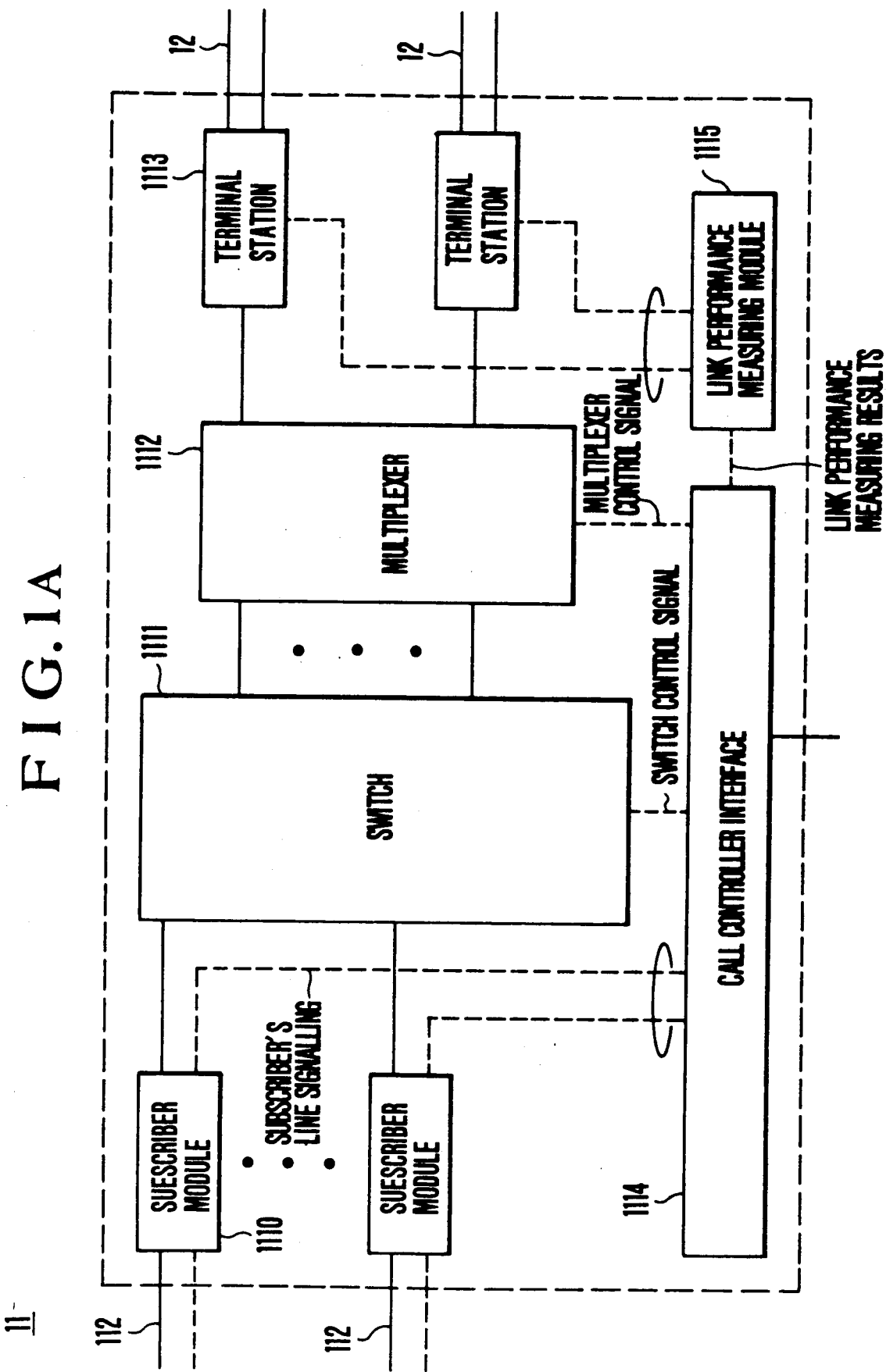
FIGS. 1A, 1B and 1C are block diagrams of the communication node, call controller and network controller of an embodiment of this invention.

FIG. 1A shows an example of the construction of the communication node 11a, 11b or 11c. The performance of the communication link 12 is measured by a link performance measuring module 1115, and the measured result is transferred from a call controller interface 1114 to the call controller 16 and then to the link performance monitor 18, where the fluctuation of the link performance is detected on the basis of the measured result of the link performance.

Figure 1B:
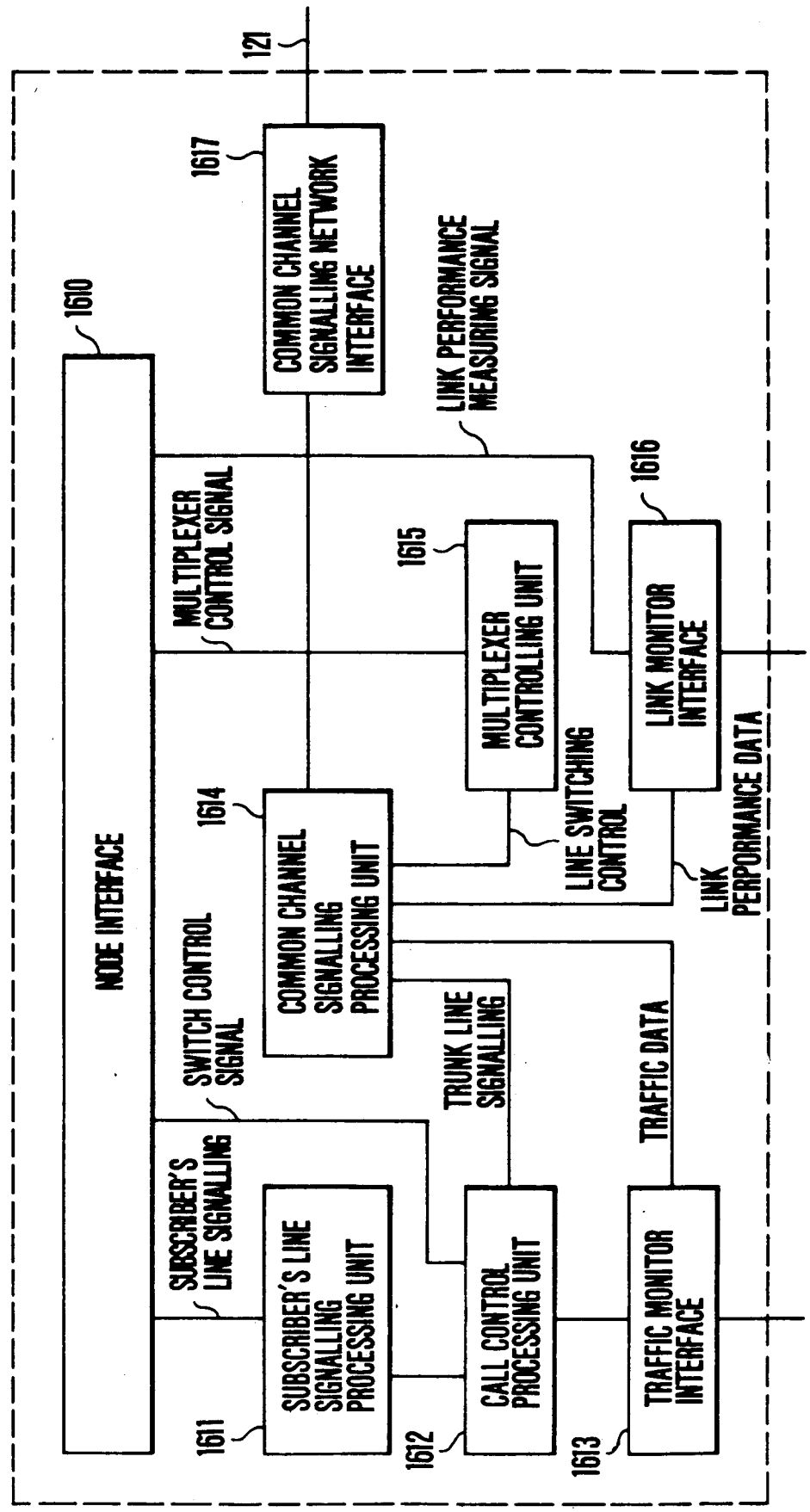
Figure 1C:
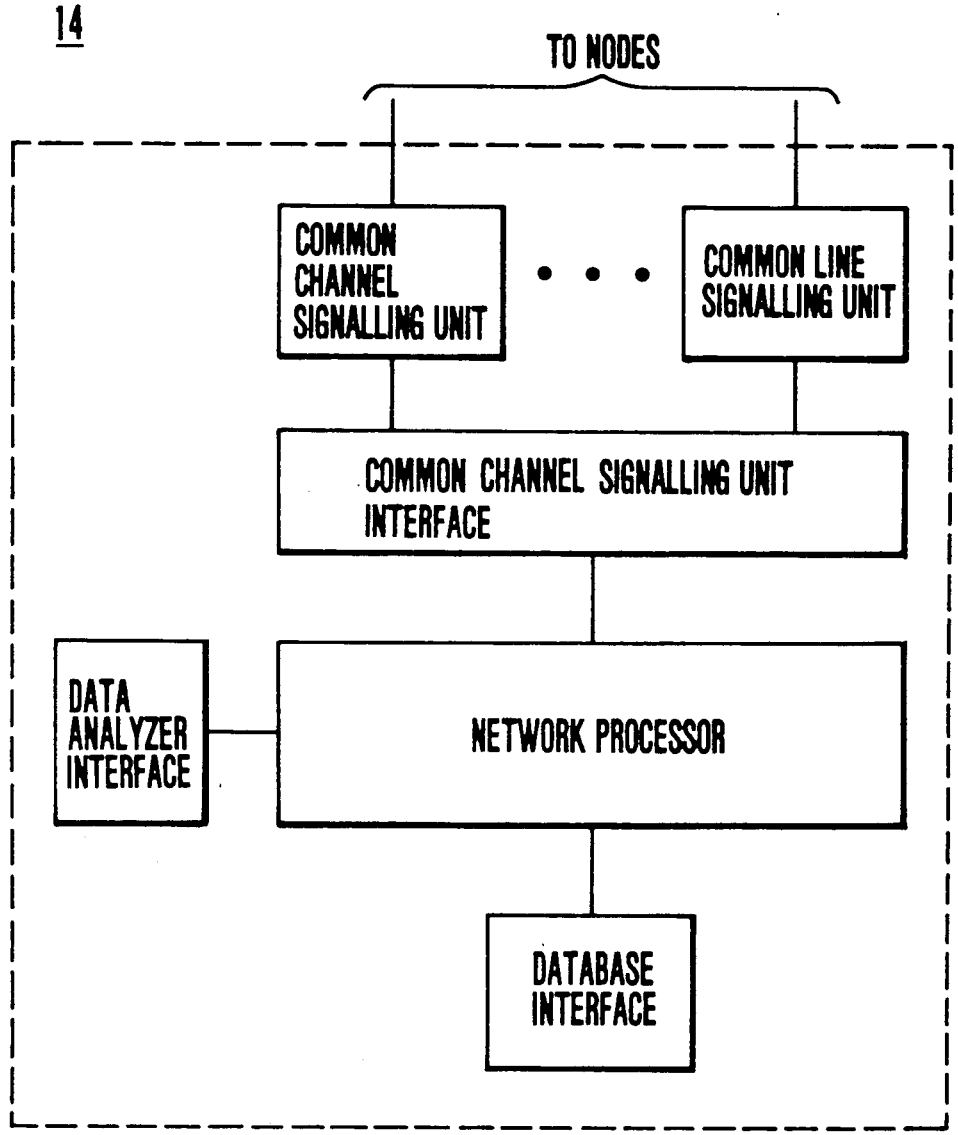

FIG. 1B shows an example of the construction of the call controller 16a, 16b or 16c, and FIG. 1C shows an example of the construction of the network controller 14.

The database storage unit 15 shown in FIG. 1 has stored therein a traffic history table shown in FIG. 3A and a routing table shown in FIG. 3B.

In FIG. 3A, the traffic history table has records of traffic measured continually or intermittently in connection with a combination of the origination node-route-destination node.

In FIG. 3B, the routing table has a record containing the origination node, route, destination node, allowable traffic, current traffic (measured traffic) and predicted traffic (future traffic). The predicted traffic is calculated by use of a predetermined algorithm on the basis of the history of measured traffic information. The allowable traffic may be properly determined in accordance with the communication performance prerequisites of communication messages (for example, delay time, delay time fluctuation or variation range, packet loss rate and so on).

The database storage unit 15, if necessary, may also store the significant call table shown in FIG. 3C. This table has a record of the significant call ID number, origination node, route, destination node, current link performance (measured link prformance) and predicted link performance. The predicted link performance is calculated by use of a predetermined algorithm on the basis of the information of the history of measured link performance similarly to the predicted traffic of the routing table shown in FIG. 3B.

Figure 4:
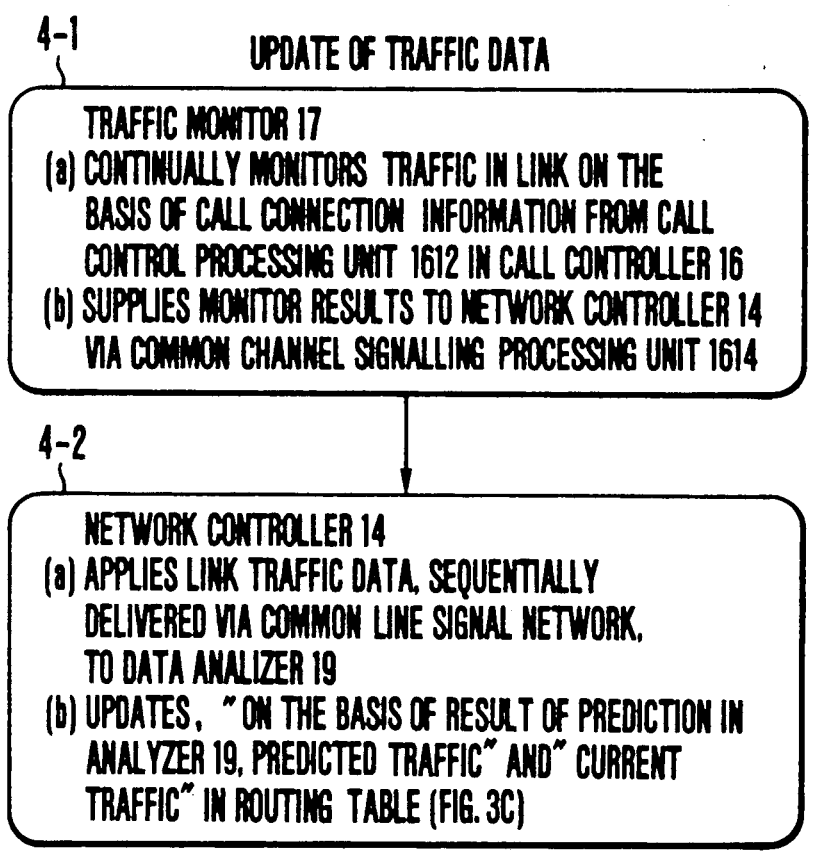
FIG. 4 is a flow chart showing the processes for updating the information of communication performance of links in the embodiments in FIGS. 1 and 2.
Figure 6:
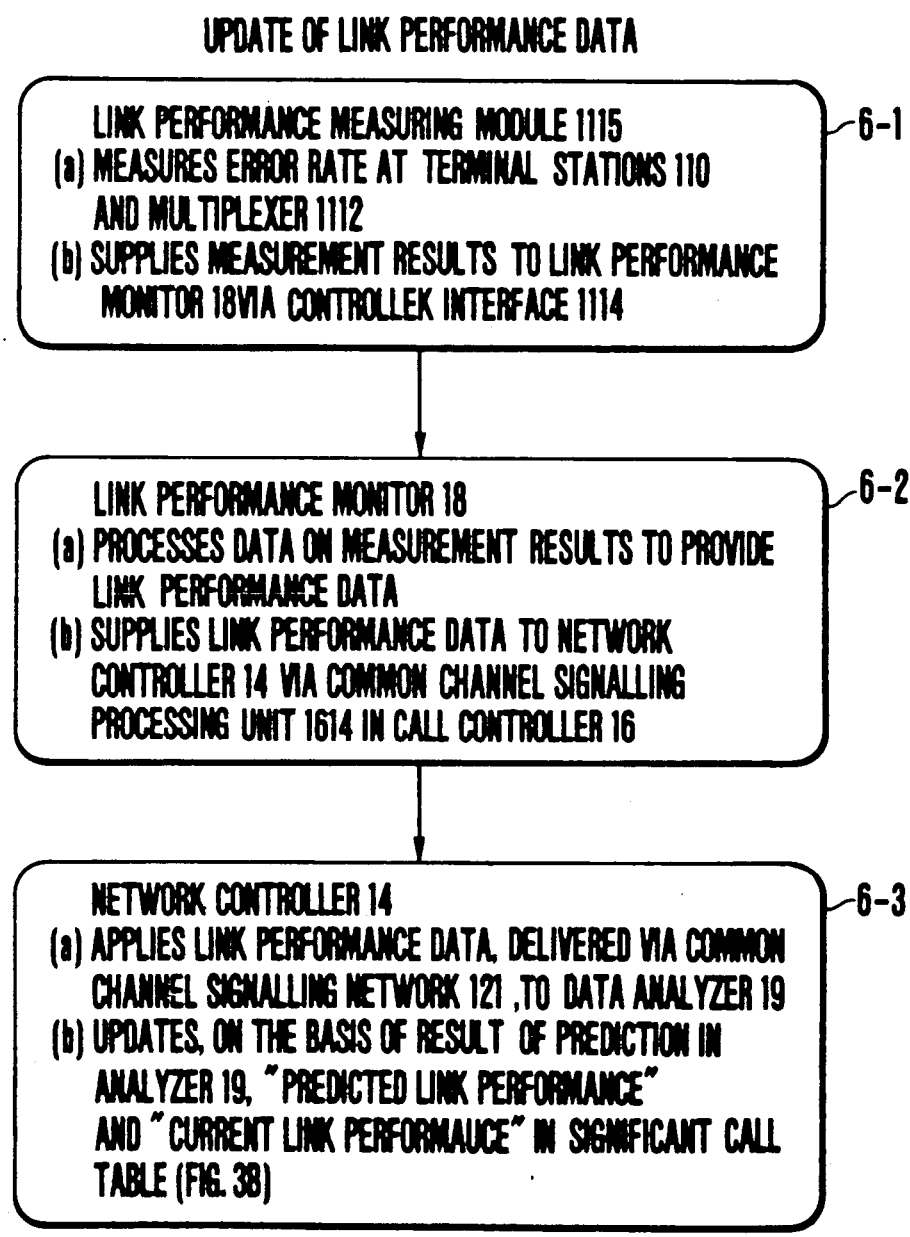
FIG. 6 is a flow chart showing the processes for updating the information of traffic in the embodiments of FIGS. 1 and 2.

At each communication node 11a, 11b, 11c, the traffic of the communication messages passing through the communication node and the link performance of the communication link 12a, 12b, 12c connecting communication nodes are continually measured by the traffic measuring device 17a, 17b, 17c and link performance monitor 18a, 18b, 18c (see step 4-1 in FIG. 4 and step 6-1 in FIG. 6). Preferably, this measurement should be made with a constant period, but may not be so.

The call controller 16a, 16b, 16c supplied data of the measured traffic and link performance to the network controller 14 through the common channel signalling network 121a, 121b, 121c. The network controller 14 causes the database storage unit 15 to sequentially store in its traffic history table (FIG. 3A), data of the date and the measured current traffic for each combination of origination node, route and destination node, and to sequentially store in the routing table (FIG. 3B) and significant call table (FIG. 3C), data of the origination node, route, destination node and the measured traffic and/or to update the data of the current traffic of the record coincident with the origination node, route and destination (step 4-2 in FIG. 4). In addition, in the routing table (FIG. 3B) and significant call table (FIG. 3C) of the database storage unit 15, data of the origination node, route, destination node and the measured current link performance are stored and/or the data of the current link performance are updated for the records concerning the origination node, route and destination node for which the measurement is effected (steps 6-2 and 6-3 in FIG. 6).

As described above, the allowable traffic in the routing table in FIG. 3B is determined in accordance with the communication performance quality prerequisites of the communication messages.

The data analyzer 19 predicts the future traffic and future link performance by a predetermined algorithm, using the data stored in the database storage unit 15.

In the communication network of FIG. 1, it is now assumed that there is a request for transmitting a communication message from any one terminal (for example, terminal 13a among a plurality of terminals connected to node 11a) to another terminal (for example, terminal 13b among a plurality of terminals connected to node 11b). The message transmitted from the terminal 13a may be a message having a high degree of prerequisite for real time property (a low degree of allowance for delay, for example, voice call) or a low degree of prerequisite for real time property (for example, data communication call). In another case, such call may be a high-priority significant call or low-priority common call. The significant call may be a call to be transmitted or having been transmitted over a leased line as will be mentioned below. That is, if the leased line service of the switched network type, or so-called software-defined network type is provided in the network shown in FIG. 1, the call transmitted over the leased line should be preferentially given a route even though in a situation in which the traffic or the link performance is abnormal.

The terminal 13a, before transmitting the communication message, supplies the called subscriber number and communication performance prerequisites to the node 11a by D-channel subscriber's line signalling (step 5-1 in FIG. 5). The communication performance prerequisites include, for example, one or more of the delay time, variation range of delay time, packet loss rate and transmission error rate, and significant common call discrimination.

The communication node 11a separates the subscriber signalling in a subscriber module 1110 (FIG. 1A), and transfer it to the call controller 16a (step 5-2 in FIG. 5).

A subscriber's line signalling processing unit 1611 (FIG. 1B) of the call controller 16a decodes the subscriber's signalling, and transfers the result to a call control processing unit 1612 (FIG. 1B) (step 5-3 in FIG. 5).

The call control processing unit 1612 converts the called subscriber's number into destination node name (step 5-4 in FIG. 5).

The call control processing unit 1612 supplies the origination node, destination node and communication performance prerequisites to the network controller 14 through a common channel signalling processing unit 1614 in the call controller 16 and the common channel signalling network 121 (process 5-5 in FIG. 5).

The network controller 14 retrieves in the routing table shown in FIG. 3B, route candidates meeting the origination node, destination node and communication performance prerequisites (step 5-6 in FIG. 5).

The network controller 14 selects with predetermined criteria, in this embodiment, selects one of the route candidates satisfying the condition that the predicted (estimated) traffic is smaller than the allowable traffic, and informs the call controller 16a that the message is transmitted through the common signal network 121a to the destination node 11a and the call controller(s) of the communication station(s) on the route (step 5-7 in FIG. 5).

The call controller 16a controls a switch 1111 (FIG. 1A) of the communication node 11a to establish the route in order that the communication message is transmitted to the route determined by the network controller 14 (step 5-8 in FIG. 5). Thus, the route to the destination terminal 13b which route assures the communication performance prerequisites from the origination terminal 13b is established and the message is transmitted through the route.

Figure 2:
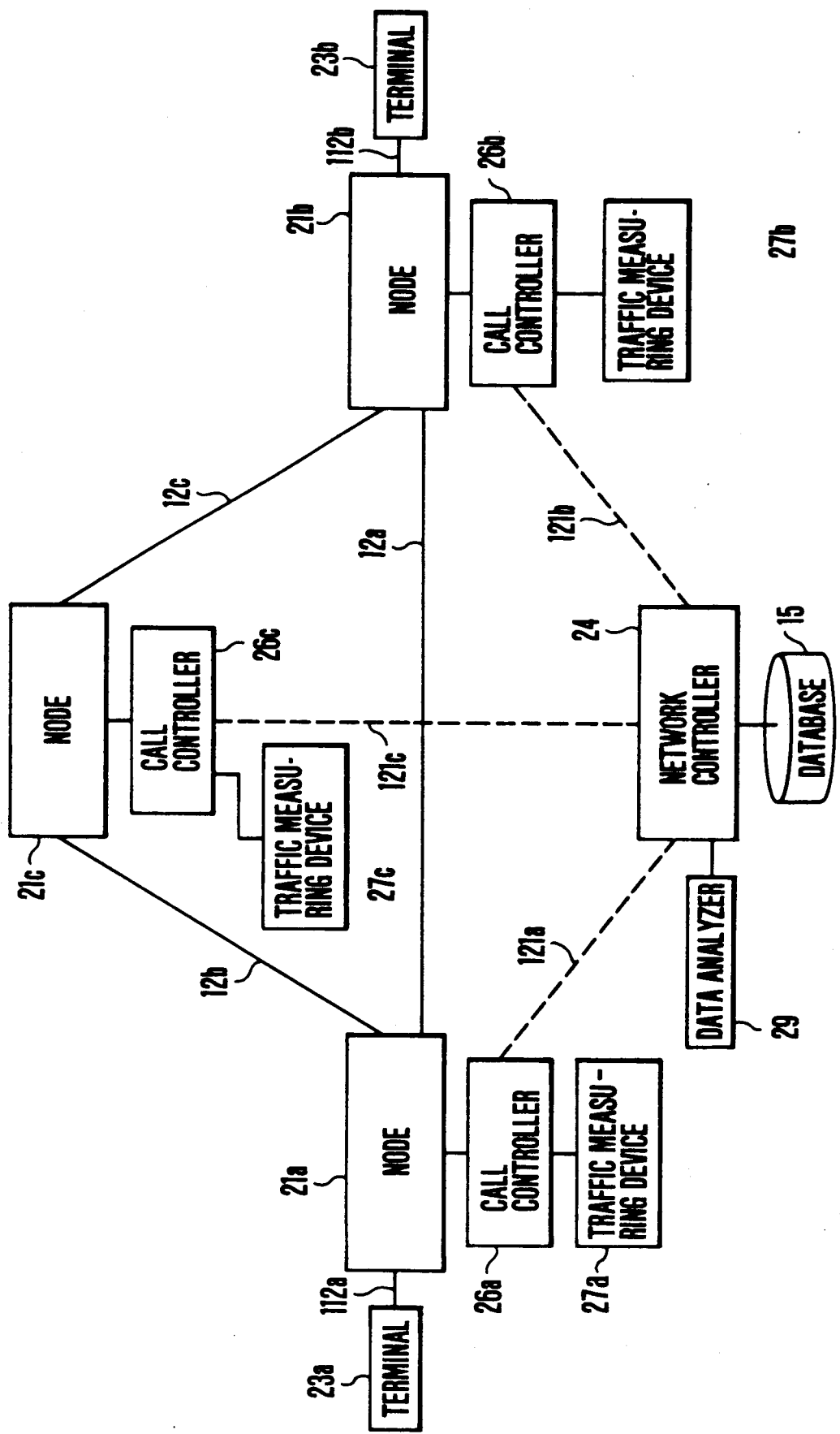
FIG. 2 is a block diagram of another embodiment of a communication network system of this invention.

If the communication network shown in FIG. 1 or 2 involves a call such as voice call requiring real time transmission and a call such as data communication call having a high degree of allowance to the delay, the network controller 14 or 24 controls routing such that the traffic in the communication link 12a is lower than the traffic in the communication link 12b, 12c. Thus, the communication node 11a or 21a routes the voice call to pass through the communication link 12a, and the data communication call to pass through the communication link 12b, 12c.

According to the network control method of this embodiment shown in FIG. 5, since the traffic is controlled not to be balanced but to have a predetermined communication performance, it is possible to meet the various requirements for the communication performance in the ATM network in which the communication performance depends on the traffic, for example, in the exchange network which handles bursty signals.

Moreover, since the above embodiment does not use measured data of link performance, it is possible to take the network construction shown in FIG. 2 which construction results from removing the link performance monitors 18a to 18c from the arrangement of FIG. 1. It is also possible to control the communication network shown in FIG. 1 for efficient operation of the network, taking into consideration the link performance (mainly determined by the transmission error rate) as well as the traffic. Measured data provided by the link performance monitor 18a and predicted link performance calculated from the measured data by a predetermined algorithm are added to the routing table shown in FIG. 3B, so that upon routing, the communication performance prerequisites are considered together with the predicted link performance quality as well as the predicted traffic. If the transmission error rate (link performance) of the communication link 12b is predicted to increase, the traffic in the communication link 12b, 12c is controlled to be lower than that in the communication link 12a because the data communication call generally has a more severe requirement for the transmission error rate than the voice call. Thus, routing is controlled such that the data communication call is passed through the communication link 12a of a low transmission error rate, and the voice call is passed through the communication link 12b, 12c of a small delay time because of low traffic.

According to the method of this embodiment, the network can be more efficiently used because both the traffic and link performance of the network are collectively analyzed for the message routing.

The network system shown in FIG. 2 is suitable particularly for exchanging bursty signals. The construction and operation of the network system will be briefly mentioned below. In FIG. 2, there are shown communication nodes 21a, 21b, 21c, communication links 12a, 12b, 12c, terminals 23a, 23b, call controllers 26a, 26b, 26c, traffic measuring devices 27a, 27b, 27c, common channel signalling network 121a, 121b, 121c, subscriber's links 112a, 112b, network controller 24, database storage unit 15, and data analyzer 29.

At each communiction node 21a, 21b or 21c the traffic in the communication node is measured by use of the traffic measuring device 27a, 27b or 27c.

The call controller 26a, 26b or 26c supplies the measured traffic through the common channel signaling network 121a, 121b, 121c to the network controller 24, which controls the database storage unit 15 to store the data.

The data analyzer 29 predicts the future traffic from the stored data and calculates for the steps of the routing for a predetermined performance. The network controller 24 provides the call controllers 26a, 26b and 26c with a route for the predetermined performance quality on the basis of the calculation result. The call controller selects the route to assure the communication performance requested for by the call origination terminal 23a, and connects the communication paths to the destination terminal 23b.

We now consider the case when the communication message received by the origination node is the high-priority significant call passing through the above-mentioned leased line.

After a route has been established by use of the predicted traffic which was obtained by a predetermined algorithm on the basis of the measured data of traffic in the network as described with reference to FIGS. 1 and 5, when the predicted link performance of the established route obtained as described with reference to FIGS. 3C and 6 is lowered, and for example, when in FIG. 1 it is predicted that an abnormality may probably be caused in the communication link 12a, the leased line service is provided through the communication link 12b, 12c, and the common call is caused to use the communication link 12a since it can often allow a high probability of blocking.

In other words, referring to FIGS. 3C and 7, the network controller 14 adds a significant call identification number to the significant call, and registers it in the significant table (FIG. 3C) of the database storage unit 15 (step 7-1 in FIG. 7).

The network controller 14 supplies to the data analyzer 19a the link performance measured data which are collected one after another through the common channel signalling network 121a, updating the predicted link performance in the significant call table (step 7-2 in FIG. 7).

When the future link performance is lowered to less than the allowable value, the network controller orders a multiplexer controlling unit 1615 (FIG. 1B) of the call controller 16a through the common channel signalling network 121a to switch routes (step 7-4 in FIG. 7).

The multiplexer controlling unit 1615 directs the multiplexer 1112 (FIG. 1A) of the communication node 11a through a communication node interface 1610 to switch routes (step 7-5 in FIG. 7).

According to the method of this embodiment, the network can be efficiently operated to satisfy the communiction performance requested by users of leased lines, public line and so on.

While in the above embodiment, routes are switched in accordance with the communication performance prerequisites, a communication link (for example, capacity of 600 Mbps) even in the same route may be divided into a plurality of smaller-capacity link elements (for example, two link elements of 300 Mbps each), so that the traffic control and link control are made for each link element to achieve the same effect.

Moreover, while in the above embodiment the network controller 14 alters the routing in accordance with the communication performance prerequisites of the communication message, data on the current traffic situation and link trouble situation (such as link fault, error rate increase) detected by the link performance monitor may be supplied to users so that the routing can be controlled at the terminal, thereby achieving the same effect. In this case, the routing is made by specifying a route at the terminal.

In the above embodiment, when the communication performance prerequisites include the upper limit of transmission delay time, the real-time equipment control information can be transmitted through the burst communication network.

Also, in the above embodiment, when the communication performance prerequisites include the range of fluctuation or variation of transmission delay time, information of voice, moving pictures and so on can be transmitted through the burst communication network.

Moreover, in the above embodiment, when the communication performance prerequisites include the lower limit of transmission error rate, the data communication call can be transmitted in smaller number of times of retransmission.

Also, in the above embodiment, when the communication performance prerequisites include the upper limit of a packet loss rate, the data communication call can be transmitted through burst communication network in smaller number of times of retransmission.

The above traffic measurement may be accomplished by known means. The call controller for controlling the communication node has data on the number of calls with respect to earth and on establishment of bearer capability for the call for the purpose of controlling the switch in the node. The traffic information can be collected by use of such data. Thus, the traffic measuring technique similar to that desclosed in JP-A-61-251261 may be employed.

Furthermore, the above measurement of link performance can be made by the known means, for example, the measuring technique disclosed in the Proceedings of the IEEE, "Error Rate Monitoring for Digital Communications", E. A. Newcombe and S. Pasupathy, Vol. 70, No. 8, pp. 805-828, 1982.

In the above-described embodiments, it is stated that prediction of the future traffic and future communication link performance is performed by predetermined algorithms. Such algorithms may be arbitrarily defined depending on the case in which the present invention is used.

For example, prediction of future traffic may be calculated according to the following equation.

Predicted Traffic=$D(t)\ W(t)\ Y(t)\ G$, where $D(t)$ represents measured values of traffic for one day with respect to time t, $W(t)$ represents measured values of traffic for one week with respect to time t, $Y(t)$ represents measured values of traffic for one year with respect to time t, and G represents growth coefficient.

Meanwhile, prediction of future link performance may be obtained by preparing a curve of history of measured values of link performance, calculating a differential coefficient at a latest time point and extrapolating a future value of the link performance therefrom.

Figure 8A:
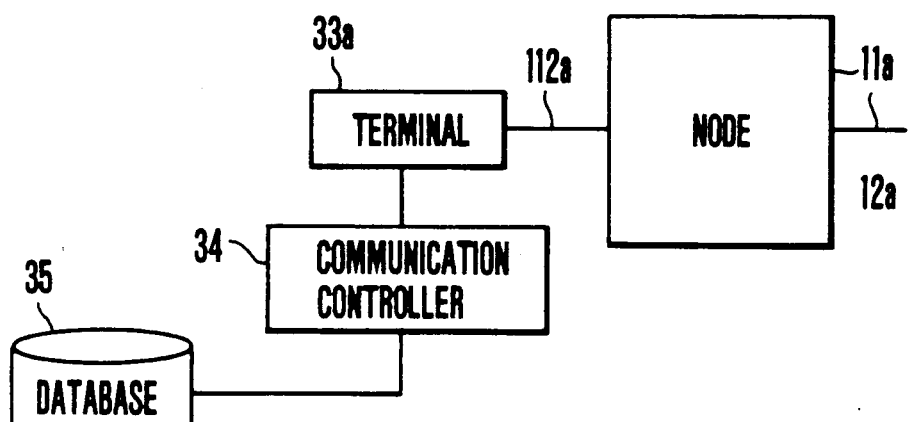
FIGS. 8A, 8B and 8C show combinations of the communication control unit and database storage unit used in the communication network in still another embodiment of this invention.
Figure 8B:
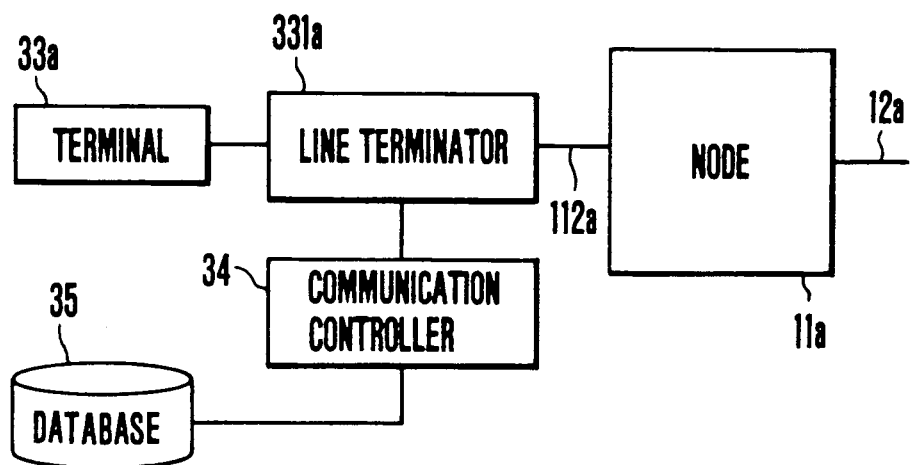
Figure 8C:
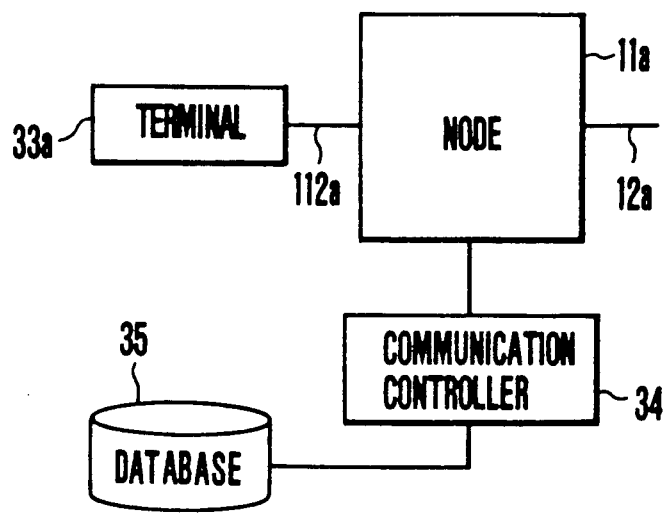

FIGS. 8A to 8C show further embodiments of this invention. There are shown the subscriber's link 112a, a line terminator 331a, a communication terminal 33a, a communication controller 34, and a database storage unit 35. The node 11a connected with a plurality of subscriber's links (only one subscriber's link is shown for the sake of simplicity) is coupled to the communication link (communication line) 12a of the communication network.

The communication terminal 33a transmits a request for communication service such as origination call request to the communication node 11a through the subscriber's link 112a or the line terminator 331a and the subscriber's link 112a. The communication controller 34 controls the database storage unit 35 to store communication service related information such as the called subscriber each time a request for communication service occurs. The database storage unit statistically processes the matters established for each communication service attribute, and arranges them with predetermined criteria (for example, in the descending order of frequency of establishment). The communication controller 34 (which may be formed by a microcomputer of 8 bits) establishes a communication service attribute while referring to the contents of the database storage unit 35 when a new request for a communication service is issued from the terminal 33a.

FIGS. 10A to 10C show examples of the tables stored in the database storage unit 35 illustrated in FIGS. 8A to 8C. The called subscriber's number establishment table shown in FIG. 10A has records each including a called subscriber's number and a number of times of call establishment. The establishment history table shown in FIG. 10B has records each including a number for call forwarding address for temporary absence and a number of times of call establishment. An establishment history table for a call forwarding address having records each including a number for call forwarding address and a number of times of establishment in the same format as in FIG. 10B may also be stored in the database storage unit 35. The protocol establishment history table shown in FIG. 10C has records each including a protocol establishment information such as information bit number, parity, Chinese character code (Kanji) and so on and the number of times of establishment.

In FIG. 8A, the communication controller 34 and the database storage unit 35 are connected to the terminal 33a. In this construction, secret information can be protected because the history at each terminal is utilized only by that terminal. In FIG. 8B, the combination of the communication controller 34 and the database storage unit 35 is connected to the line terminator 331a, which is connected to a plurality of terminals. In this embodiment, the database can be shared by a plurality of terminals. In this construction, there occur the cases in which the memory region in the database storage unit is divided into parts for the terminals, and in which the history of each terminal is processed at a time. When the memory region is divided, the secret of each terminal can be protected. When the history of each terminal is used at a time, and when the history of use at each terminal is the same, effective statistical processing can be made.

In FIG. 8C, the combination of the communication controller 34 and the database storage unit is connected to the communication node 11a. In this arrangement, the memory region of the database storage unit is divided into parts for the subscriber's link 112a. Since this embodiment enables many users to use the database at a time, the efficiency of usage is increased, and there is no need to prepare a terminal having database. Normally most users tend to establish a particular communication service attribute at a time. Thus, the arrangement shown in FIGS. 8A to 8C is advantageous in that the establishment of the communication service attribute can be simplified.

Figure 9:
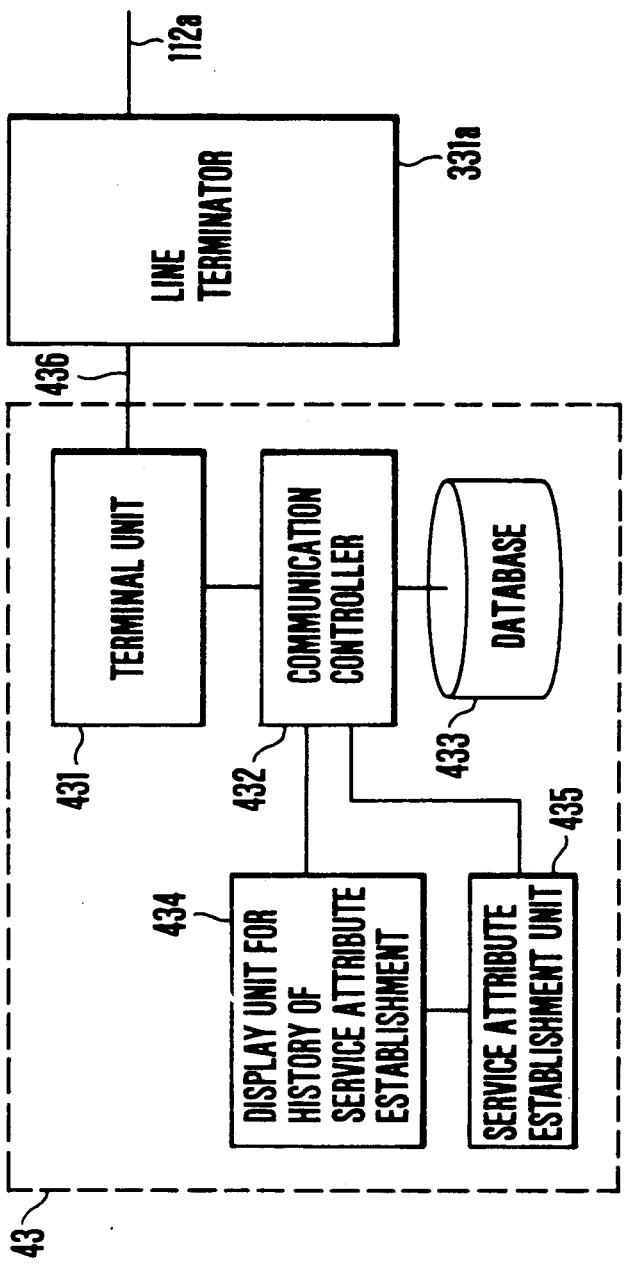
FIG. 9 shows a specific arrangement of the embodiment of FIG. 8B.

FIG. 9 shows a specific example of the combination of the communication controller 34 and the database storage unit 35 in the embodiment of FIGS. 8A to 8C. Particularly in this example, the combination is connected to the terminal, and the terminal (together with other terminals) is connected to the line terminator. There are shown the subscriber's link 112a, the line terminator 331a, house wiring 436, a communication terminal 43, a communication terminal unit 431, a communication controller 432, a database storage unit 433, a display unit 434 for displaying history of service attribute establishment, and a service attribute establishing unit (for example, keyboard, dial of telephone set) 435.

The communication terminal unit 431 transmits a request for communication service such as origination call to a communication node not shown through the house wiring 436, line terminator 331a, and the subscriber's link 112a. The communication controller 432 stores in the database 433 the communication service attribute establishment matters such as the subscriber's numbers each time a request for communication service is issued. The database storage unit statistically processes each of the communication service attributes establishment matters, and arranges them in accordance with predetermined criteria (for example, in the order of set frequency). When a new request for communication service is issued from the communication terminal unit 431, the communication controller 432 displays the history or the communication service attribute establishment history on the display unit 434 while referring to the contents of the database 433. The user selects establishment matters from the communication service attribute establishing unit 435 while viewing the display 434.

According to the arrangement of this embodiment, the communication service attribute can easily be established and thus the user conveniently uses the system.

Figure 11:
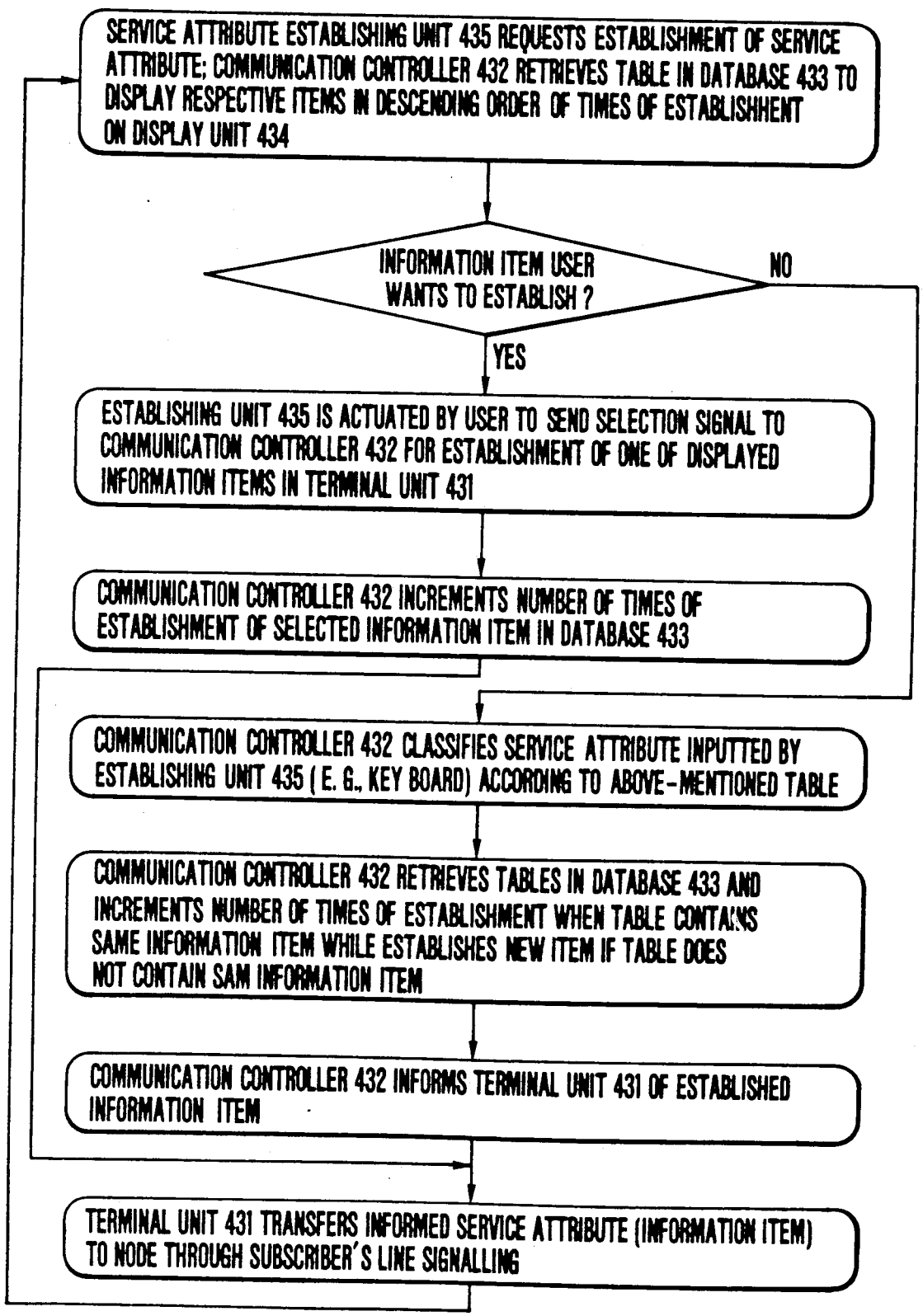
FIG. 11 is a flow chart showing the processes of operation of the terminal in the embodiment of FIGS. 8A, 8B and 8C.

FIG. 11 shows one example of the steps of the operation of the communication controller of FIG. 9.

Figure 12A:
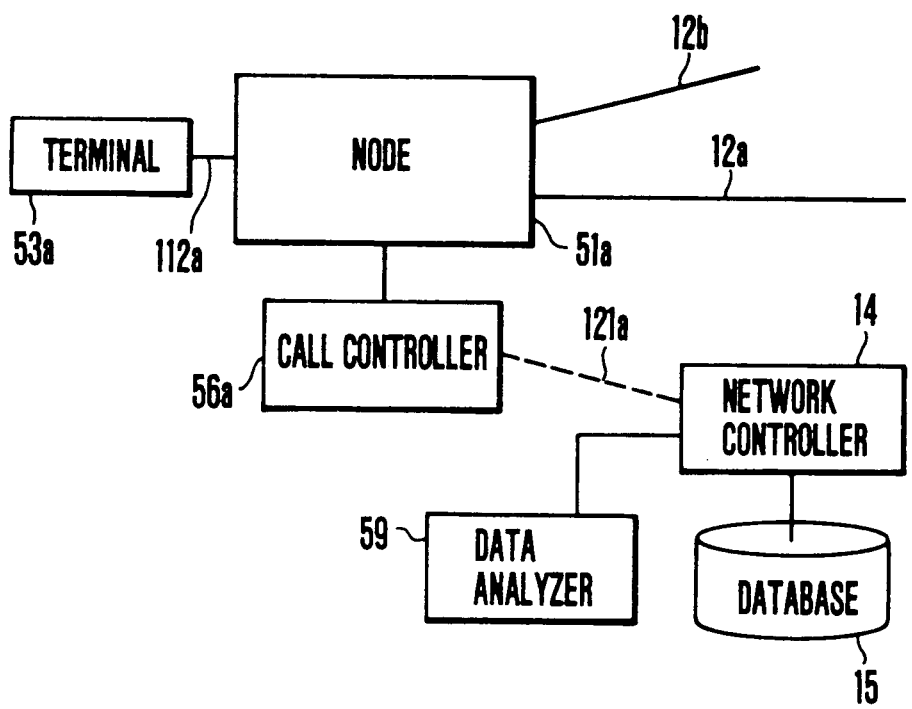
FIGS. 12A and 12B are diagrams of the communication network system in a further embodiment of this invention.
Figure 12B:
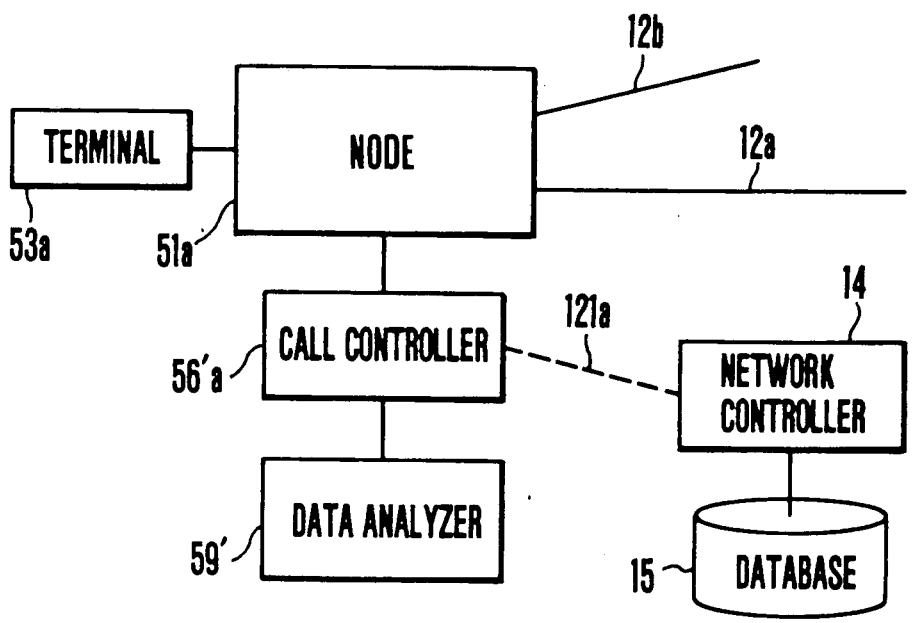

FIGS. 12A and 12B show a still further embodiment of this invention. In this embodiment, the data analyzer, 59,59' measures the traffic fluctuation or variation and-/or the link trouble at predetermined time points and a certain number of times and predicts a communication time range in which required communication performance can be obtained from the measured data, in accordance with a predetermined manner or algorithm. The communication node 51a receives from the data analyzer the predicted communication time range in which required communication performance is obtained, and displays it when a request for communication is issued from the terminal 53a. The terminal, while viewing the display, originates a call in the time range in which necessary communication performance quality can be assured.

According to this embodiment, since the traffic control can be made by the limit of the time range for origination call issued from the terminal, the network can be controlled simply and conveniently.

FIG. 12A shows an example in which the network controller 14 is provided with the data analyzer 59, and FIG. 12B shows an example in which the communication node is provided with the data analyzer 59'.

Figure 13:
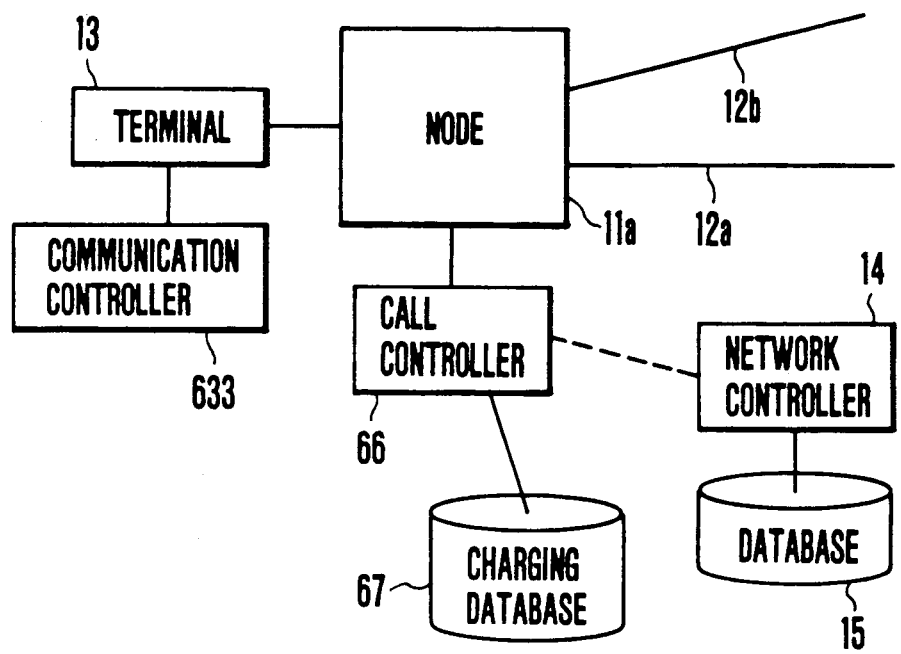
FIGS. 13 and 14 are diagrams of the communication network system in a still further embodiment of this invention.

FIG. 13 shows a further embodiment of this invention. In this embodiment, the traffic control is made by changing the charge in accordance with the traffic situation.

The call controller 66 of the communication node 11a responds to the information indicating that calls are predicted to concentrate on a particular communication performance prerequisite traffic, from the network controller 14 to change the charge information present in a charge purpose database storage unit 67 for the calls associated with the traffic, and to inform the terminal of the change of charge.

According to this embodiment, the traffic can be effectively controlled through the charge information.

Figure 14:
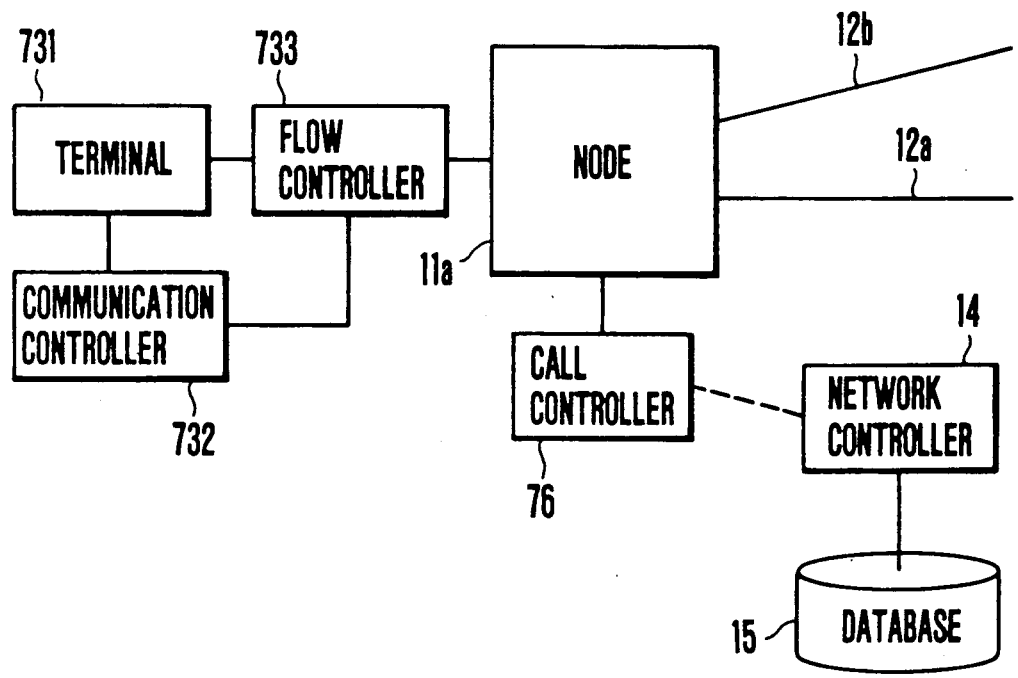

FIG. 14 shows a still further embodiment of this invention. The call controller 76 of the communication node 11a responds to the information indicating that calls are predicted to concentrate on a particular communication performance prerequisite traffic, from the network controller 14 to inform of this fact the communication controller 732 of the terminal 731 which originates a call associated with the traffic. The communication controller is responsive to this information, to control a flow controller 733, so that the amount of information from the terminal is limited.

It is assumed that the terminal 731 is provided with a magnetic disc device and is required to transmit the content of a magnetic disk in the device to a magnetic device of another terminal. Normally, the terminal reads out the content of the disk at a maximum rate and send the data in the content to the node 11a. However, if a request is made to the flow controller 733 from the node 11a to adjust or control data flow, the flow controller 733 requests the terminal 731 to suppress the output of transmission data therefrom. The terminal 731, in response to the flow controller, now operates to read out data from the disk intermittently to thereby decrease the rate of generation of the output transmission data.

According to this embodiment, since the amount of generation of data, not the origination call, from the terminal is restricted, the user is little affected by the restriction.

We claim:

1. A communication network system comprising a communication line, a plurality of communication stations each having a respective node coupled to said communication line and means coupled to said communication stations for controlling routing of messages between said nodes, and each of said nodes being connected to a respective plurality of one or more terminals, in which:

at least one of said communication stations, said one communication station having a plurality of two or more terminals connected to its respective node, includes means for discriminating a communication performance prerequisite data indicative of communication performance prerequisites associated with a communication message to be sent from one terminal to another terminal via the node in said one station, and means for monitoring traffic in various routes between the node in said one station and nodes in other communication stations; and said routing controlling means includes a storage unit and a control unit, said control unit receiving information on said monitored traffic from said communication stations, storing the received information in said storage unit, predicting future traffic in said routes on the basis of the information on said monitored traffic by the use of a predetermined algorithm, storing information on said predicted future traffic in said storage unit, said predicted future traffic information being updated by the use of latest stored information on monitored traffic, and determining routes for communication messages on the basis of an output of said communication performance prerequisite data discriminating means and the updated information on said predicted traffic in said storage unit.

2. A system according to claim 1, in which said at least one communication station further includes means for monitoring communication performance quality of said various routes so that said control unit receives from said communication station and stores in said storage unit information on the monitored traffic and measured communication performance quality, predicts future traffic and future communication performance quality on the basis of the information on said monitored traffic and performance quality by the use of predetermined algorithms, storing information on said predicted future traffic and future performance quality in said storage unit, said predicted future traffic information and said predicted future performance quality information being updated by the use of latest stored information on monitored traffic and performance quality, and determines routes for communication messages on the basis of an output of said communication message discriminating means and predetermined criteria with respect to the updated information on said predicted traffic and performance quality in said storage unit.

3. A method of controlling a communication network including a communication line and a plurality of communication stations each having a respective node coupled to said communication line, comprising the steps of:
    monitoring, in each of said communication stations, traffic in routes between the node in each said station and nodes in other communication stations;
    storing information on said monitored traffic in a storage unit;
    predicting, in each of said stations, future traffic in said routes on the basis of the information on said monitored traffic by the use of a predetermined algorithm and storing information on the predicted future traffic information being updated by the use of latest stored information on monitored traffic;
    discriminating, in the node in any one of said communication stations, a communication performance prerequisite data indicative of communication performance prerequisites associated with a communication message to be sent from a terminal to another terminal via the node in said any one communication station;
    determining a route for said communication message on the basis of a result of said prerequisite data discrimination and the updated information on said predicted traffic in said storage unit; and
    establishing said determined route for said communication message.

4. A method according to claim 3, further comprising the step of monitoring, in said each communication station, communication performance quality of said routes between the node in said each station and nodes in other communication stations so that information on said monitored traffic and communication performance quality are stored in said storage unit, said each station predicts future traffic and future communication performance quality on the basis of the information on said monitored traffic and performance quality by the use of predetermined algorithms, the information on said predicted future traffic and the information on said predicted performance quality are updated by the use of latest stored information on monitored traffic and measured performance quality and said route for said communication message is determined on the basis of a result of said prerequisites discrimination and predetermined criteria with respect to the updated information on said predicted traffic and performance quality in said storage unit.

5. A method according to claim 3, in which said communication performance prerequisites include an upper limit of a transmission delay time.

6. A method according to claim 3, in which said communication performance prerequisites include an allowable range of variation of a transmission delay time.

7. A method according to claim 3, in which said communication performance prerequisites include an upper limit of a transmission error rate.

8. A method according to claim 3, in which said communication performance prerequisites include an upper limit of a packet loss rate.

9. A method according to claim 3, in which said prediction of future traffic is performed a predetermined number of times so that said establishing of the determined route is made when the communication performance prerequisites indicated by said prerequisite data are met.

10. A method according to claim 3, in which sending of a communication message from a terminal to another terminal via the node in said any one communication station is effected with an amount of charge for the message communication recognized, the method further comprising the step of changing an amount of charge for the message communication depending upon the time of the sending of the message communication.

11. A method according to claim 3, further comprising the step of suppressing data flow from a terminal when predicted traffic in a route satisfying particular communication performance prerequisites is heavy.

12. A combination of a communication control unit and a database storage unit for use with a terminal coupled to one of nodes in a communication network, said terminal having a display device and capable of requesting said node for a communication service to said network, in which: said communication control unit includes means for storing information on service attributes of a communication service in the form of a record in said storage unit each time a request for a communication service is made from a terminal to said node and means for processing the stored information to re-arrange records in a predetermined order, said control unit being coupled to said display device for displaying the records of service attributes having stored in said database storage unit in response to said request for a communication service.

13. A combination according to claim 12, in which a database storage unit is provided for each terminal.

14. A combination according to claim 12, in which a database storage unit is provided for a plurality of terminals which are connected to a node through a line terminator.

15. A combination according to claim 12, in which a database storage unit is provided for each node.

16. A communication method in a communication network including a communication line and a plurality of communication nodes coupled to said communication line, a plurality of one or more terminals being connected with at least one of said nodes through a line terminator, comprising the steps of:

storing information on communication service attributes of a communication service in a database storage unit in the form of a record each time a request for communication service is made from a terminal;

re-arranging the records in said database storage unit in a predetermined order;

displaying the re-arranged records on a display device;

selecting a service attribute among the displayed records; and requesting the node for a communication service with the selected service attribute.

17. A communication method according to claim 16, in which said re-arranging of said records is in a descending order of the frequency of occurrence of a request for communication service.

18. A communication method according to claim 17, in which said communication service attributes contains an identification number of a terminal to be called.

19. A communication method according to claim 17, in which said communication service attributes contains protocol information.

20. A communication method according to claim 17, in which said communication service attributes contains information on a call forwarding address for temporary absence of a user.

21. A communication method according to claim 17, in which said communication service attributes contains information on a call forwarding address.

* * * * *